(12) United States Patent
Tiirola et al.

(10) Patent No.: US 8,483,149 B2
(45) Date of Patent: Jul. 9, 2013

(54) RESOURCE ALLOCATION TECHNIQUE FOR PHYSICAL UPLINK CONTROL CHANNEL BLANKING

(75) Inventors: Esa T. Tiirola, Kempele (FI); Kari P. Pajukoski, Oulu (FI); Timo Lunttila, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 563 days.

(21) Appl. No.: 12/632,218

(22) Filed: Dec. 7, 2009

(65) Prior Publication Data
US 2010/0142467 A1   Jun. 10, 2010

Related U.S. Application Data

(60) Provisional application No. 61/200,994, filed on Dec. 5, 2008.

(51) Int. Cl.
*H04W 4/00* (2009.01)
*H04B 7/216* (2006.01)

(52) U.S. Cl.
USPC .......................................... 370/329; 370/441

(58) Field of Classification Search
None
See application file for complete search history.

(56) References Cited

U.S. PATENT DOCUMENTS

| | | | |
|---|---|---|---|
| 5,371,548 A | 12/1994 | Williams | 348/478 |
| 8,042,033 B2* | 10/2011 | Karmanenko et al. | 714/807 |
| 2005/0163194 A1 | 7/2005 | Gore et al. | 375/132 |
| 2005/0254555 A1 | 11/2005 | Teague | 375/136 |
| 2008/0186880 A1 | 8/2008 | Seki et al. | 370/281 |
| 2008/0304588 A1 | 12/2008 | Pi | 375/260 |
| 2009/0207797 A1* | 8/2009 | Shen et al. | 370/329 |
| 2009/0257520 A1* | 10/2009 | Lin et al. | 375/260 |
| 2009/0290549 A1 | 11/2009 | Tiirola et al. | 370/329 |
| 2010/0067472 A1 | 3/2010 | Ball et al. | 370/329 |

FOREIGN PATENT DOCUMENTS

| | | |
|---|---|---|
| EP | 1 819 069 A2 | 8/2007 |
| EP | 1 906 686 A1 | 4/2008 |
| WO | WO 2007/045504 A1 | 4/2007 |

OTHER PUBLICATIONS

3GPP TS 36.101 V8.1.0 (Mar. 2008), "$3^{rd}$ Generation Partnership Project; Technical Specification Group Radio Access Network; Evolved Universal Terrestrial Radio Access (E-UTRA); User Equipment (UE) Radio Transmission and Reception", (Release 8), (43 pages).

(Continued)

*Primary Examiner* — Jutai Kao
(74) *Attorney, Agent, or Firm* — Harrington & Smith

(57) ABSTRACT

The exemplary embodiments of the invention provide at least a method and apparatus for defining a set of parameters to establish a possibility for a single user equipment to transmit uplink data on a physical uplink shared channel via two or more clusters including adjacent resource blocks, where at least one of the clusters includes at least one blanked physical uplink control channel resource block and where at least one of the clusters includes at least one physical shared channel resource block, and transmitting the parameters to at least the single user equipment. Further, the exemplary embodiments of the invention provide at least a method and apparatus for receiving a set of parameters defining a physical uplink control channel and allocating physical/virtual resource blocks based at least on received physical uplink control channel configuration parameters, a received resource allocation and predefined physical resource block mapping rules.

21 Claims, 9 Drawing Sheets

OTHER PUBLICATIONS

3GPP TS 36.101 V8.5.1 (Mar. 2009), "3$^{rd}$ Generation Partnership Project; Technical Specification Group Radio Access Network; Evolved Universal Terrestrial Radio Access (E-UTRA); User Equipment (UE) Radio Transmission and Reception", (Release 8), (121 pages).

3GPP TS 36.104 V8.1.0 (Mar. 2008), "3$^{rd}$ Generation Partnership Project; Technical Specification Group Radio Access Network; Evolved Universal Terrestrial Radio Access (E-UTRA); Base Station (BS) Radio Transmission and Reception", (Release 8), (52 pages).

3GPP TS 36.211 V8.2.0 (Mar. 2008), "3$^{rd}$ Generation Partnership Project; Technical Specification Group Radio Access Network; Evolved Universal Terrestrial Radio Access (E-UTRA); Physical Channels and Modulation", (Release 8), (67 pages).

3GPP TS 36.211 V8.3.0 (May 2008), "3$^{rd}$ Generation Partnership Project; Technical Specification Group Radio Access Network; Evolved Universal Terrestrial Radio Access (E-UTRA); Physical Channels and Modulation", (Release 8), (79 pages).

3GPP TS 36.211 V8.4.0 (Sep. 2008), "3$^{rd}$ Generation Partnership Project; Technical Specification Group Radio Access Network; Evolved Universal Terrestrial Radio Access (E-UTRA); Physical Channels and Modulation", (Release 8), (80 pages).

3GPP TS 36.212 V8.2.0 (Mar. 2008), "3$^{rd}$ Generation Partnership Project; Technical Specification Group Radio Access Network; Evolved Universal Terrestrial Radio Access (E-UTRA); Multiplexing and Channel Coding", (Release 8), (38 pages).

3GPP TS 36.212 V8.3.0 (May 2008), "3$^{rd}$ Generation Partnership Project; Technical Specification Group Radio Access Network; Evolved Universal Terrestrial Radio Access (E-UTRA); Multiplexing and Channel Coding", (Release 8), (48 pages).

3GPP TS 36.213 V8.2.0 (Mar. 2008), "3$^{rd}$ Generation Partnership Project; Technical Specification Group Radio Access Network; Evolved Universal Terrestrial Radio Access (E-UTRA); Physical Layer Procedures", (Release 8), (30 pages).

3GPP TS 36.213 V8.3.0 (May 2008), "3$^{rd}$ Generation Partnership Project; Technical Specification Group Radio Access Network; Evolved Universal Terrestrial Radio Access (E-UTRA); Physical Layer Procedures", (Release 8), (45 pages).

3GPP TS 36.300 V8.3.0 (Dec. 2007), "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2", (Release 8), (121 pages).

3GPP TS 36.300 V8.5.0 (May 2008), "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2", (Release 8), (134 pages).

3GPP TR 36.942 V1.0.0 (Feb. 2007), "3$^{rd}$ Generation Partnership Project; Technical Specification Group Radio Access Network; Evolved Universal Terrestrial Radio Access (E-UTRA); Radio Frequency (RF) System Scenarios", (Release 8), (56 pages).

3GPP TR 36.942 V1.2.0 (Jun. 2007), "3$^{rd}$ Generation Partnership Project; Technical Specification Group Radio Access Network; Evolved Universal Terrestrial Radio Access (E-UTRA); Radio Frequency (RF) System Scenarios", (Release 8), (68 pages).

Yoo, et al., "Edge Sidelobe Suppressor Schemes for Uplink of Orthogonal Frequency Division Multiple Access Systems", (2002), (pp. 584-588).

Brandes, et al., "Reduction of Out-of-Band Radiation in OFSM Based Overlay Systems", (2005), (pp. 662-665).

3GPP TSG RAN WG4 (Radio) Meeting #4, Juju, Korea, Motorola, "Adjacent Channel UL/DL Co-Existence", Aug. 18-22, 2008, R4-080aaa, (6 pages).

3GPP TSG RAN WG1 Meeting #47bis, Sorrento, Italy, ETRI, "Downlink L1/L2 Control Signaling", Jan. 15-19, 2007, R1-070079, (10 pages).

3GPP TSG-RAN4 Meeting #48bis, Edinburgh, Scotland, "LS on UE Emission Control", Sep. 29-Oct. 3, 2008,R4-082585, (2 pages).

3GPP TSG RAN WG4 (Radio) Meeting #48, JuJu Island, South Korea, Motorola, "Adjacent Channel UL/DL Co-Existence", Aug. 18-22, 2008, R4-082027, (6 pages).

3GPP TSG RAN WG1 Meeting #52bis, Shenzhen, China, Nokia Siemens Networks, Nokia, "Channelization of SRI and Persistent ACK/NACK on PUCCH", Mar. 31-Apr. 4, 2008, R1-081460, (5 pages).

3GPP TSG-RAN WG1 Meeting #52, Sorrento, Italy, Ericsson, Change Request, "Update of Uplink Reference-signal Hopping, Downlink Reference Signals, Scrambling Sequences, DwPTS/UpPTS Lengths for TDDand Control Channel Processing", Feb. 11-15, 2008, R1-081155, (61 pages).

TSG-RAN WG1 #53bis, Warsaw, Poland, Ericsson, "Carrier Aggregation in LTE-Advanced", Jun. 30-Jul. 4, 2008, R1-082468, (6 pages).

3GPP TSG-RAN Meeting #53, Kansas City, MO, Ericsson, Change Request, "Correction of PUCCH in Absent of Mixed Format", May 5-9, 2008, R1-082063, (6 pages).

3GPP TSG RAN WG1 Meeting #53, Kansas City, MO, "Proposals for LTE-Advanced Technologies", May 5-9, 2008, R1-081948, (29 pages).

3GPP TSG-RAN1 Meeting #55, Prague, Czech Republic, Motorola, et al., "Clarification to Enable Reuse of Non-Active PUCCH CQI RBs for PUSCH", Nov. 10-14, 2008, R1-084666, (4 pages).

* cited by examiner

```
          LOGICAL PUCCH  CYCLIC SHIFT
          RB INDEX(m)       (CS)
                         ┌─────────┐
                         │    0    │
                         ├─────────┤
                  ┌──────┤    1    │
                  │   0  │         │
                  │      ├─────────┤
                  │      │   11    │
                  ├──────┼─────────┤
                  │      │    0    │
          $N_{RB}^{(2)}$ │    1    │─ PUCCH FORMATS 2/2a/2b
                  │   1  │         │
                  │      ├─────────┤
                  │      │   11    │
                  ├──────┼─────────┤
                  │      │    0    │
                  │   2  │    1    │
                  │      │         │
                  │      ├─────────┤
                  │      │   11    │
                  ├──────┼─────────┤
          MIXED   │      │    0    │─ $N_{CS}^{(1)}$ ─ PUCCH FORMATS 1/1a/1b
           RB     │   3  │    1    │
                  │      ├─────────┤─ PUCCH FORMATS 2/2a/2b
                  │      │   11    │
                  ├──────┼─────────┤
                  │      │    0    │
                  │   4  │    1    │
                  │      │         │
                  │      ├─────────┤
                  │      │   11    │
                  ├──────┼─────────┤
          $N_{RB}^{HO}-N_{RB}^{(2)}-1$ │         │─ PUCCH FORMATS 1/1a/1b
                  │      │         │
                  ├──────┼─────────┤
                  │      │    0    │
                  │$N_{RB}^{HO}-1$│    1    │
                  │      │         │
                  │      ├─────────┤
                  │      │   11    │
                  └──────┴─────────┘
                       FIG.1
```

| PRB INDEX | | |
|---|---|---|
| | | OTHER BAND WITH EMISSION LIMITS |
| 0 | | BLANKED PUCCH, LEFT EMPTY TO PROTECT THE GRAY AREA |
| 1 | | |
| 2 | | ACTIVE PUCCH |
| 3 | | |
| 4 | | |
| 5 | | |
| 6 | | |
| 7 | | MAXIMUM BW FOR ONE UE |
| 8 | | |
| 9 | | |
| 10 | | |
| 11 | | |
| 12 | | ACTIVE PUCCH |
| 13 | | |
| 14 | | BLANKED PUCCH, CAN BE USED FOR DATA |
| 15 | | |

FIG.3

RESOURCE ALLOCATION TECHNIQUE FOR PHYSICAL UPLINK CONTROL CHANNEL BLANKING

CROSS-REFERENCE TO RELATED APPLICATIONS

This patent application claims priority under 35 U.S.C. §119(e) from Provisional Patent Application No. 61/200,994, filed Dec. 5, 2008, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques for signaling between user equipment and a network access node.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various abbreviations that appear in the specification and/or in the drawing figures are defined as follows:

| | |
|---|---|
| 3GPP | third generation partnership project |
| UTRAN | universal terrestrial radio access network |
| EUTRAN | evolved UTRAN (LTE) |
| LTE | long term evolution |
| Node B | base station |
| eNB | EUTRAN Node B (evolved Node B) |
| UE | user equipment |
| UL | uplink (UE towards eNB) |
| DL | downlink (eNB towards UE) |
| DCI | downlink control information |
| EPC | evolved packet core |
| MME | mobility management entity |
| S-GW | serving gateway |
| MM | mobility management |
| PHY | physical |
| RLC | radio link control |
| MAC | medium access control |
| RB | resource block |
| PRB | physical resource block |
| PDCP | packet data convergence protocol |
| O&M | operations and maintenance |
| CDM | code division multiplexing |
| CQI | channel quality indicator |
| FDMA | frequency division multiple access |
| HARQ | hybrid automatic repeat request |
| ACK | acknowledgement |
| NACK | negative ACK |
| OFDMA | orthogonal frequency division multiple access |
| SC-FDMA | single carrier, frequency division multiple access |
| PMI | Precoding Matrix Indicator |
| PUCCH | physical uplink control channel |
| PUSCH | physical uplink shared channel |
| PCFICH | physical control format channel |
| Rel-8 | release 8 |
| RI | Rank Indicator |
| MIB | master information block |
| SIB | system information block |
| SRI | scheduling request indicator |
| SRS | sounding reference signal |
| TTI | transmission time interval |
| ICIC | inter-cell interference coordination |
| ACLR | adjacent channel leakage ratio |
| CM | cubic metric |
| ZAC | Zero AutoCorrelation |

A communication system known as evolved UTRAN (E-UTRAN, also referred to as UTRAN-LTE or as E-UTRA) has been under development within the 3GPP. In this system the DL access technique will be OFDMA, and the UL access technique will be SC-FDMA.

One specification of interest to these and other issues related to the invention is 3GPP TS 36.300, V8.5.0 (2008-05), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), which is incorporated by reference herein in its entirety.

FIG. 4 reproduces FIG. 4-1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of user data stream;
selection of a MME at UE attachment;
routing of User Plane data towards Serving Gateway;
scheduling and transmission of paging messages (originated from the MME);
scheduling and transmission of broadcast information (originated from the MME or O&M); and
measurement and measurement reporting configurations for mobility and scheduling.

The PUCCH carries UL control information such as ACK/NACK (A/N), CQI, PMI, RI and a Scheduling Request Indicator (SRI). The PUCCH is used in the absence of UL data, and a single UE never transmits PUCCH simultaneously with PUSCH in LTE Rel. 8. FIG. 1 shows the logical split between different PUCCH formats and how the PUCCH is configured in the LTE specification. Reference can be made to 3GPP TS 36.211 V8.3.0 (2008-05), 3rd Generation Partnership Project; Technical Specification Group Radio Access Network; Evolved Universal Terrestrial Radio Access (E-UTRA); Physical Channels and Modulation (Release 8).

FIG. 1 shows the configuration of the PUCCH.

Different UEs are multiplexed on the PUCCH by means of CDM (i.e., CDM within the same resource block (RB)). Two basic PUCCH formats are supported in LTE Rel. 8 specifications, namely Format 1 and Format 2. Both formats use a cyclic shift of a ZAC sequence in each symbol (CDM in cyclic shift domain). Format 1 also utilizes block-wise spreading on top of the ZAC sequence (CDM using block spreading codes). PUCCH formats are used in the following manner:

Format 1: SRI
Format 1a: 1-bit A/N
Format 1b: 2-bit A/N
Format 2: Periodic CQI/PMI/RI
Format 2a: Periodic CQI/PMI/RI+1-bit A/N
Format 2b: Periodic CQI/PMI/RI+2-bit A/N The PUCCH is configured using the following parameters (see 3GPP TS 36.211 for a complete list):

$N_{RB}^{HO}$ The offset used for PUSCH frequency hopping, expressed in number of resource blocks (set by higher layers)

$N_{RB}^{(2)}$ Bandwidth reserved for PUCCH formats 2/2a/2b, expressed in multiples of $N_{sc}^{RB}$ $N_{cs}^{(1)}$ Number of cyclic shifts used for PUCCH formats 1/1a/1b in a resource block with a mix of formats 1/1 a/1b and 2/2a/2b $N_{sc}^{RB}$ Resource block size in the frequency domain, expressed as a number of subcarriers (=12)

Mapping of logical resource blocks (denoted as m) into physical resource blocks is shown in FIG. 2. Note that slot-based frequency hopping is always used on PUCCH.

$n_{PRB}$ Physical resource block number (index)

$N_{RB}^{UL}$ Uplink bandwidth configuration, expressed in multiples of ($N_{sc}^{RB}$=12)

By configuration of the PUCCH reserved resources available PUSCH resources can be defined, as well as potential positions of the PRACH (to be within the PUSCH resource area).

Note that it has been decided that the sounding reference signal transmission can be semi-statically configured with respect to the bandwidth (within the PUSCH area).

The uplink bandwidth may be flexibly configured by applying PUCCH blanking as described in commonly owned and copending U.S. Provisional Patent Application No. 61/128,341, filed May 21, 2008 by Esa Tiirola, Kari Hooli, Kari Pajukoski and Sabine Rössel, entitled "Deployment Of LTE UL System For Arbitrary System Bandwidths via PUCCH Configuration".

It has been agreed in 3GPP RAN WG#1 that in the LTE Rel-8 specifications a method for providing UL bandwidth flexibility, referred to as PUCCH blanking, is supported. Reference may be made to R1-084666, Change Request 36.211 CR 113, "Clarification to enable reuse of non-active PUCCH CQI RBs for PUSCH", 3GPP TSG-RAN1 Meeting #55, Prague, Czech Republic, Nov. 10-14, 2008. The basic idea of PUCCH blanking is to over-dimension the PUCCH region, i.e., allocate more resources/PRBs to PUCCH usage than strictly required, and to leave the outermost PRBs unused. In this manner the UL bandwidth can be reduced symmetrically with respect to the center frequency to meet, for example, requirements of a certain operator. However, PUCCH blanking as defined in LTE Rel-8 reduces the achievable peak data rates of a single user, and may furthermore be problematic if the operator happens to have stringent requirements for emissions only on one side of the band.

A simple example of a common use case is shown in FIG. 3. The PUCCH is over-dimensioned by allocating 8 PRBs for the PUCCH (PRBs #0-4 and 12-15), and leaving the four outermost PRBs empty (two on each side). Since the resource allocation in LTE Rel-8 needs to be contiguous to maintain the SC properties, the maximum bandwidth that can be allocated to a single UE is reduced by 2 PRBs.

In FIG. 3 the neighboring band with stringent emission requirements is designated as "other band with emission limits" or as the "gray area". In order to the meet the out-of-band emission requirements the LTE operator needs to reduce the UL system bandwidth by utilizing PUCCH blanking. In the example the two PRBs closest to the gray, non-LTE band are left empty. The symmetrical property of PUCCH blanking results in the active part of the PUCCH being shifted towards the center of the band, leaving the two outermost PRBs on the other side of the spectrum (PRB index 14 and 15) separated from the rest of the data PRBs. This situation has been referred to as PUSCH fragmentation.

Since in LTE Rel-8 the UL PUSCH allocations need to be contiguous, only 8 PRBs (PRB index 4-11) can be allocated to a single UE simultaneously for PUSCH transmission, even though there are two more PRBs available for the PUSCH. This situation results in a loss in terms of maximum bit rate per UE. In practical scenarios the number of blanked PRBs may be as great as 10-12, corresponding to a peak data rate loss of up to 12*144*6 bits/ms=10.4 Mbit/s.

As a solution to avoid spectrum fragmentation due to symmetrical PUCCH blanking, more flexible PUCCH allocation schemes have been presented in commonly owned and copending U.S. Provisional Patent Application No. 61/189,033, filed Aug. 15, 2008 by Carsten Ball, Sabine Rössel, Esa Tiirola, Kari Hooli, Kari Pajukoski and Miko Pesola, and entitled "Backward Compatible Physical Uplink Control Channel Resource Mapping".

Reference may also be made to 3GPP TSG RAN WG4 (Radio) Meeting #48, R4-082027 Jeju Island, South Korea, 18 to 22 Aug. 2008, "Adjacent Channel UL/DL Co-existence", Motorola.

Another technique to avoid the loss in peak data rates would be to allow for non-contiguous resource allocations in UL. This has been agreed to be included in the LTE-Advanced (sometimes referred to as Rel-10). These proposals assume that a new UL grant/DCI format is introduced, with no restrictions related to non-contiguous allocations (similar to some of the existing DL DCI formats). However, defining completely new resource allocation mechanisms and DCI formats is a rather long and involved process. Furthermore, defining new DCI formats does not necessarily solve the issue alone.

To at least overcome the problems discussed above, techniques are needed to at least maintain high peak data rates with PUCCH blanking.

SUMMARY

In an exemplary aspect of the invention, there is a method comprising defining a set of parameters to establish a possibility for a single user equipment to transmit uplink data on a physical uplink shared channel via two or more clusters including adjacent resource blocks, where at least one of the clusters includes at least one blanked physical uplink control channel resource block and where at least one of the clusters includes at least one physical shared channel resource block, and transmitting the parameters to at least the single user equipment.

In still another exemplary aspect of the invention, there is a computer readable medium encoded with a computer program executable by a processor to perform actions comprising defining a set of parameters to establish a possibility for a single user equipment to transmit uplink data on a physical uplink shared channel via two or more clusters including adjacent resource blocks, where at least one of the clusters includes at least one blanked physical uplink control channel resource block and where at least one of the clusters includes at least one physical shared channel resource block, and transmitting the parameters to at least the single user equipment.

In another exemplary aspect of the invention, there is a apparatus comprising at least one processor, and at least one memory including computer program code, where the at least one memory and the computer program code are configured, with the at least one processor, to cause the apparatus to at least define a set of parameters to establish a possibility for a single user equipment to transmit uplink data on a physical uplink shared channel via two or more clusters including adjacent resource blocks, where at least one of the clusters includes at least one blanked physical uplink control channel resource block and where at least one of the clusters includes at least one physical shared channel resource block, and transmit the parameters to at least the single user equipment.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1 shows the configuration of the PUCCH.

FIG. 3 shows an example of PUCCH blanking in LTE Rel-8.

DETAILED DESCRIPTION

The exemplary embodiments of this invention relate generally to the UL part of the UTRAN LTE Rel. 8 and its evolution towards further releases (e.g., towards LTE-Advanced or LTE-A). More specifically, the exemplary embodiments consider the resource mapping of the PUCCH, and the implications on the resource allocation of the PUSCH.

The exemplary embodiments of this invention provide techniques for maintaining high peak data rates with PUCCH blanking, and thus overcome the problems discussed above.

Prior to this invention there were no fully satisfactory solutions to the problems that were discussed above.

Figure 2:
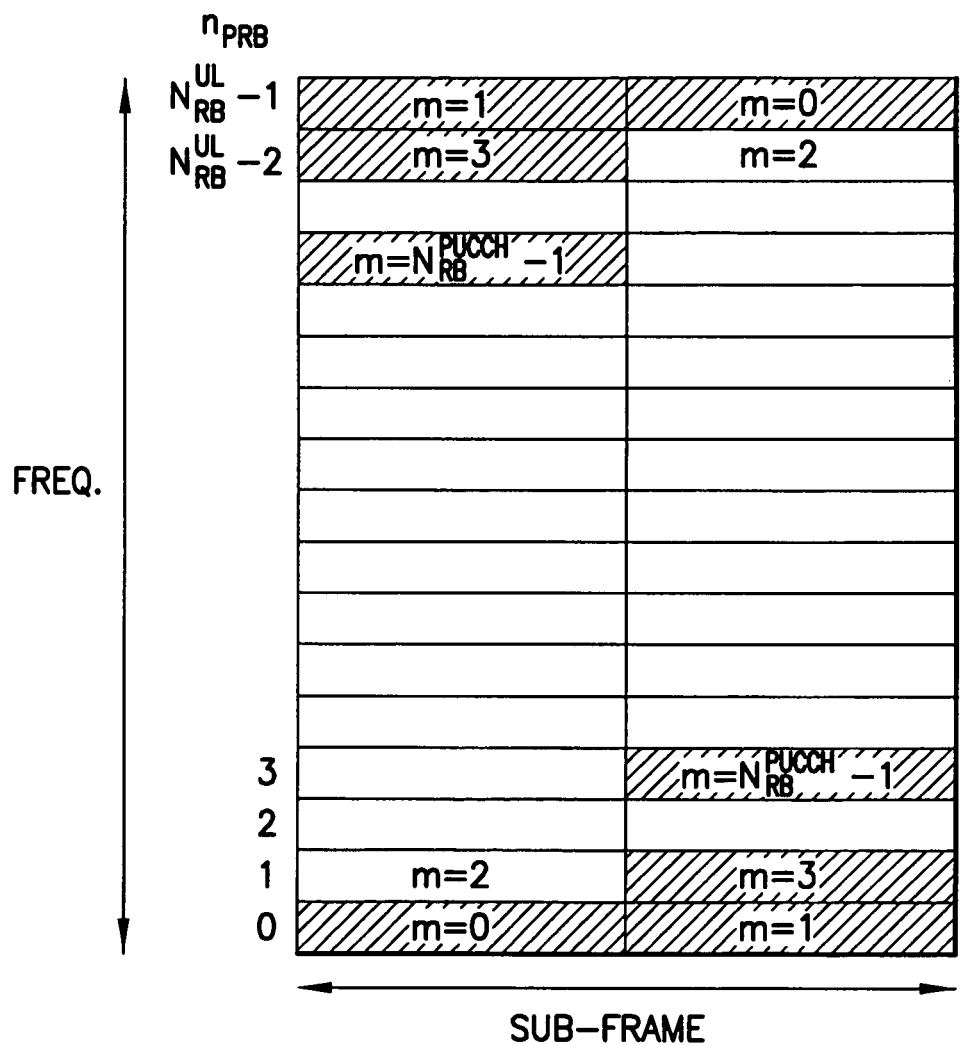
FIG. 2 illustrates a mapping to physical resource blocks for the PUCCH as per 3GPP TS 36.211.
Figure 4:
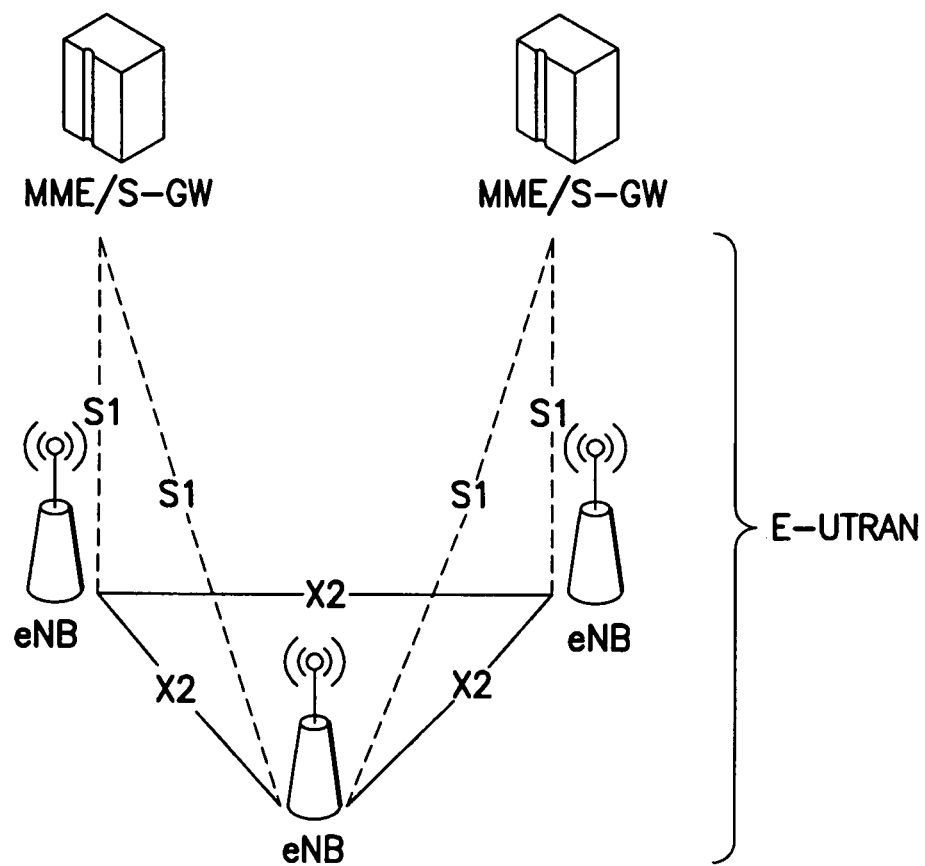
FIG. 4 reproduces FIG. 4-1 of 3GPP TS 36.300, and shows the overall architecture of the E-UTRAN system.
Figure 5:
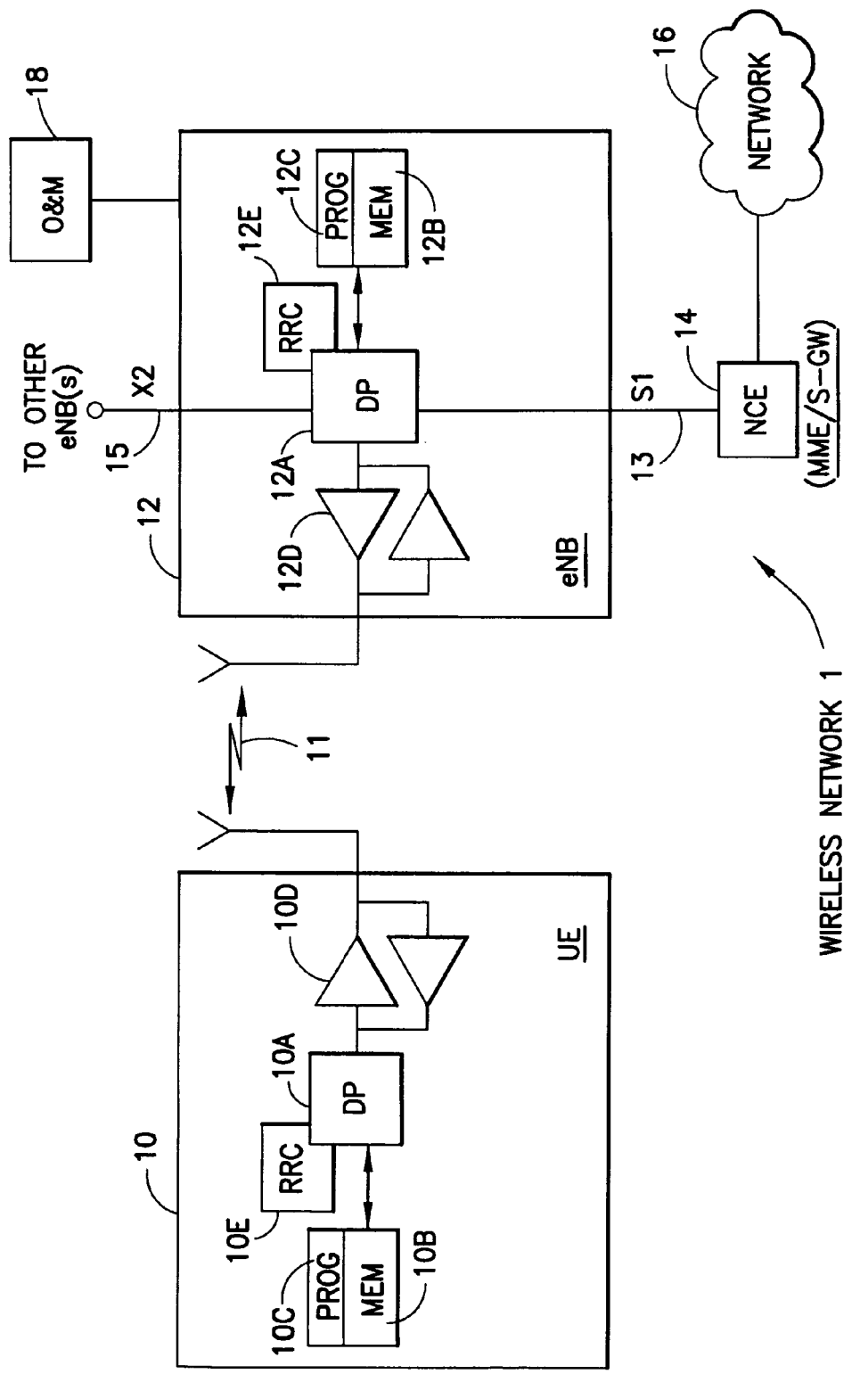
FIG. 5 shows a simplified block diagram of various electronic devices that are suitable for use in practicing the exemplary embodiments of this invention.

Reference is made first to FIG. 5 for illustrating a simplified block diagram of various electronic devices that are suitable for use in practicing the exemplary embodiments of this invention. In FIG. 5 a wireless network 1 is adapted for communication with an apparatus, such as one that embodies or that is embodied in a mobile communication device (which may be referred to as a UE 10), via a network access node, such as a Node B (base station), and more specifically an eNB 12. The network 1 may include a network control element (NCE) 14 that may include the MME/S-GW functionality shown in FIG. 4, and which provides connectivity with a network 16, such as a telephone network and/or a data communications network (e.g., the Internet). The UE 10 includes a data processor (DP) 10A, a memory (MEM) 10B that stores a program (PROG) 10C, and a suitable radio frequency (RF) transceiver 10D for bidirectional wireless communications 11 with the eNB 12 via one or more antennas. The eNB 12 also includes a DP 12A, a MEM 12B that stores a PROG 12C, and a suitable RF transceiver 12D. The eNB 12 is coupled via a data path 13 to the NCE 14. The data path 13 may be implemented as the S1 interface shown in FIG. 4. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the eNB 12, or by hardware, or by a combination of software and hardware.

An O&M function 18 may also be coupled with the eNB 12.

For the purposes of describing the exemplary embodiments of this invention the UE 10 may be assumed to also include a RRC function 10E, and the eNB 12 includes a corresponding RRC function 12E. Signaling of PUCCH parameters between the eNB 12 and the UE 10 may be achieved using RRC signaling.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on multi-core processor architectures, as non-limiting examples.

The use of the exemplary embodiments of this invention allows for non-contiguous resource allocation in LTE beyond Rel-8 in order to remove the unnecessary limitations regarding UL peak data rates with PUCH blanking. The non-contiguous allocations are realized with minimal changes to the specifications, and without a need to design any new DCI formats. This may be achieved by defining rules for the UE 10 behavior. Depending on the UL resource allocation signaling in the UL grant and the location of the PUCCH PRBs, the UE 10 knows how to interpret the existing DCI format 0 (UL grant) so that all the PRBs can be addressed simultaneously.

There are several possible approaches/embodiments to achieve the desired resource allocation flexibility in accordance with the exemplary embodiments of this invention.

3, #12 and #13 are used for PUCCH transmission. If the UE 10 then receives an UL grant with the Starting Resource Block=4 and Number of contiguously allocated resource blocks=10, it knows to use the PRBs 4-11 and 14-15 for PUSCH transmission, and leave the PRBs 12-13 unoccupied as shown below.

| | PRB # | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| PUCCH resource alloc. | | | x | x | 1 | 2 | 3 | 4 | 5 | 6 | 7 | 8 | x | x | 9 | 10 |

Approach 1

In the first approach the active/occupied part of the PUCCH is made known to the UE 10. According to the LTE Rel-8 specifications, the UE always knows the innermost PRBs occupied by the PUCCH. This information is available from the parameter $N_{RB}^{HO}$, which indicates the maximum number of PRBs reserved for the PUCCH, while the actual PUCCH size changes dynamically based on the PCFICH transmitted on downlink control channel. The parameter $N_{RB}^{HO}$ is used in LTE Rel-8 to define the size of the frequency hopping PUSCH region (set by higher layers).

Alternatively, the instantaneous maximum number of PUCCH PRBs can be derived based on the value of PCFICH for each subframe separately. When using the PCFICH based approach, a number of other PUCCH configuration parameters may be used to clarify the number of PRBs occupied by the PUCCH. These parameters are:

(i) The number of resource blocks reserved for PUCCH Format 2/2a/2b configured by system parameter $N_{RB}^{(2)}$ (ii) The number of cyclic shifts reserved for PUCCH Format 1/1a/1b on the mixed PUCCH resource block configured by system parameter $N_{cs}^{(1)}$. The mixed resource block contains both PUCCH Format 2/2a/2b and PUCCH Format 1/1a/1b resources.

(iii) The number of PUCCH Format 1/1a/1b resources reserved for persistent ACK/NACK and scheduling requests, configured by $N_{PUCCH}^{(1)}$ (broadcasted).

(iv) Delta_shift parameter (broadcasted), which is the cyclic shift difference between two adjacent ACK/NACK resources on PUCCH Format 1/1a/1b.

What the UE 10 does not know based on LTE Release-8 is the number of blanked PRBs. In order to utilize Approach 1, a new parameter may be defined:

$N_{RB}^{blank}$, which specifies the number of blank resource blocks (PRBs) on each side of the spectrum (or, alternatively, the total number of blank resource blocks).

This parameter is set by higher layers (e.g., by RRC signaling), and may be signaled to the UE 10 in, for example, a MIB or one of the SIBs. Alternatively, separate parameters for both the lower and upper band edge may be defined as well. With this knowledge, the UE 10 can, based on any UL resource allocation given with DCI format 0 (UL grant), simply avoid transmitting data on those PRBs occupied by the PUCCH.

As an example, assume the UL resource allocations in LTE Rel-8 have the format:

$RB_{STARTs}$ starting resource block; and $L_{CRBs}$ number of contiguously allocated resource blocks.

Now, assuming the numerology from FIG. 3, the parameter $N_{RB}^{blank}$=2. Hence the UE 10 knows that only the PRBs #2, It should be noted that the exemplary embodiments of this invention may be used with all possible UL resource allocation techniques. For example, the embodiments may be used with the above-mentioned DCI format 0 (UL grant) technique, or in the case of semi-persistent scheduling the resource allocation is made with dedicated RRC signaling as opposed to the use of DCI format 0.

Approach 2

In the second approach/embodiment the active (occupied) part of the PUCCH is not known by the UE 10. Similar to Approach 1, the UE 10 always knows the innermost PRBs occupied by the PUCCH (e.g., by means of $N_{RB}^{HO}$ or the PCFICH and the broadcasted PUCCH configuration parameters).

The resource allocation in the UL grant/DCI format 0 is interpreted differently in case the resource allocation overlaps with the PUCCH region.

In this approach one new parameter may be defined:

Location_of_fragmented_PUSCH_region.

This parameter indicates where the possibly available PUSCH fragment is located. The parameter is set by higher layers (e.g., by RRC signaling), and can be signaled in a MIB or in one of the SIBs. There are four possible values (which may be expressed in as few as two signaling bits):

(i) no PUCCH blanking→no PUSCH fragments available;

(ii) PUSCH fragment on the lower side of the spectrum;

(iii) PUSCH fragment on the upper side of the spectrum; or (iv) PUSCH fragments on both sides of the spectrum.

Knowing the location of the fragmented PUSCH available for data transmission, the UE can correctly interpret the UL grant. Note that the UE 10 responds to the relationship between the signaling of the Location_of_fragmented_PUSCH region and the RB mapping rule, such that the selection of the applied RB mapping rule can be based on the higher layer signaling.

It is possible to support the second approach (Approach 2) without the use of any additional configuration parameters. This can be accomplished, for example, such that a predefined UE 10 operation is defined by the specification, e.g., based on the PUSCH fragment on the upper side of the spectrum.

As an example, assume that the PUSCH fragment is located on the upper side of the spectrum, and assume further that the total number of PRBs is 20, the Starting Resource Block=11 and the Number of contiguously allocated resource blocks=7. The principle is shown below, where the available PUSCH fragment is on the PRBs #17-19.

| | PRB # | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| PUCCH resource alloc. | | | | x | x | | | | | | | 1 | 2 | 3 | 4 | x | x | | 7 | 6 | 5 |

The UE 10 knows that the PRB #15 is occupied by the PUCCH but is not sure of the PRBs 16-19. The UE 10 interprets the UL grant so that it allocates all the PRBs starting from Starting Resource Block=11 until the last PRB it knows not to belong to the PUCCH. The UE 10 then begins allocating PRBs from the edge of the spectrum (PRB #19) towards the center of the band. The UE 10 does not need to know how many PRBs are allocated for the PUCCH, instead it may just obey the allocation given by the eNB 12. The eNB 12 ensures that it does not include PRBs reserved for the PUCCH in the allocation.

Another example of Approach 2 is shown below. Here the available PUSCH fragment is on the PRBs #0-2, while the Starting Resource Block is still equal to 11.

| | PRB # | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| PUCCH resource alloc. | 5 | 6 | 7 | x | x | | | | | | | 1 | 2 | 3 | 4 | x | x | | | | |

It is also possible to generate resource mapping of Approach 2 according to the example shown below (w/minimum frequency spacing between two clusters).

| | PRB # | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| PUCCH resource alloc. | 4 | 5 | | x | x | | 3 | 2 | 1 | | | | | | | x | x | | | | |

It is also possible to allocate resources based on Approach 2 in such that the first RB is located in one of the outer PUSCH fragments as shown in example below.

| | PRB # | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| PUCCH resource alloc. | | | | x | x | | | | | | | | 5 | 4 | 3 | x | x | | | 1 | 2 |

As another example, in principle it is possible to allocate data on both PUSCH fragments as well. An example of such scenario is shown below, where the available PUSCH fragment is on the PRBs #0-2 and 17-19.

| | PRB # | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| PUCCH resource alloc. | 6 | | | x | x | | | | | | | | 1 | 2 | 3 | x | x | | 4 | 7 | 5 |

It is possible to configure the RB allocation rule shown immediately above in such a manner that the PUSCH fragment located on one side of the spectrum (e.g., upper side) is allocated before PUSCH fragment located on another side of the spectrum (e.g., lower side). This technique implies that the number of the blank PRBs is known in advance (i.e., as in Approach 1).

It is also possible to generalize the PRB mapping/numbering according to the example shown below (GPRB corresponds to generalized physical resource block). When using this approach allocation of resources on different PUSCH fragments is under control of the eNB 12 in all cases.

| | | | | | | | | | | PRB # | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| PUCCH | | | | | x | x | | | | | | | | | | | x | x | | | |
| GPRB # | 4 | 3 | 2 | 1 | | | 5 | 6 | 7 | 8 | 9 | 10 | 11 | 12 | 13 | 14 | | | 18 | 17 | 16 | 15 |

Regarding to PRB mapping it should be understood that the PRB allocation (resource allocation) schemes cover both mapping of physical resource blocks and mapping of virtual resource blocks. Virtual resource blocks are used, e.g., in the case of PUSCH hopping. This is noted so as to generalize the resource allocation principle: i.e., what is the signaled resource allocation with respect to what are the actual PRBs used for transmitting the PUSCH.

Cubic Metric Properties

Figure 6:
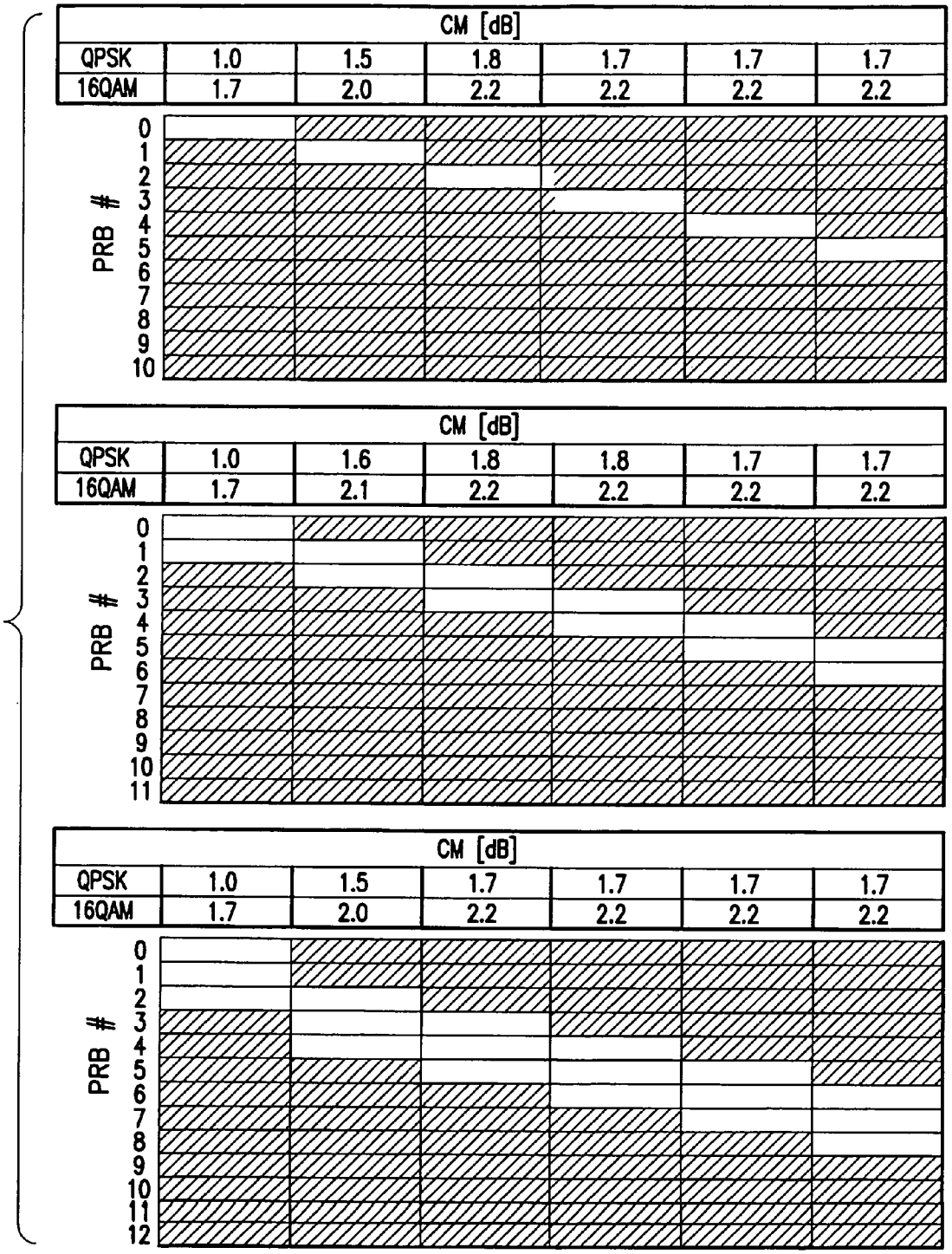
FIG. 6 shows the CM properties of clustered subcarrier mapping according to the exemplary embodiments of the invention with 1-2 PUSCH fragments, where the PUSCH allocation is 10 PRBs and the PUCCH size varies from 1 to 3 PRBs.
Figure 7:
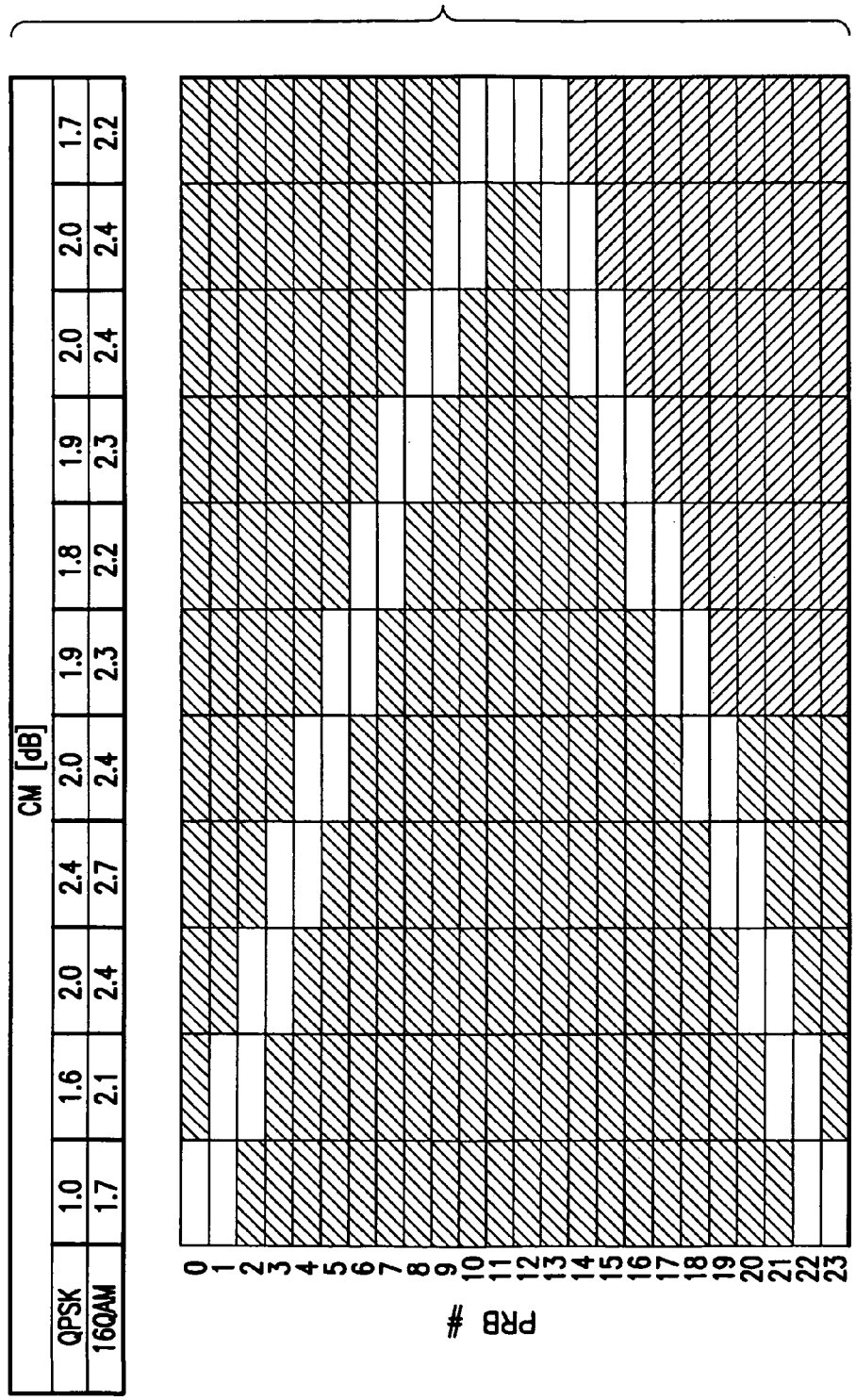
FIG. 7 shows the CM properties of clustered subcarrier mapping according to the exemplary embodiments of the invention with 2-3 PUSCH fragments, where the PUSCH allocation is 20 PRBs and the PUCCH size is 2 PRBs.

An important motivation as to why only the contiguous resource allocation is supported in the LTE Rel-8 UL is due to the fact that the cubic metric (CM) increases along with the number of clusters. With a higher CM the UE 10 power amplifier needs to reduce the transmit power, resulting in reduced coverage. However, allowing for only two or three clusters results in an adequate increment in the CM as show in FIGS. 6 and 7. With one additional PUSCH fragment the maximum CM increment is 0.8 dB for QPSK and 0.5 dB for 16 QAM. Furthermore, the eNB 12 can readily avoid scheduling multiple clusters to power limited UEs, while the other UEs do not suffer from the power back-off due to CM.

There are a number of advantages that can be realized by the implementation and use of the exemplary embodiments of this invention. One significant benefit that is obtained is that a high peak data rate can be maintained in the case of PUCCH blanking. In typical deployments the number of blanked PUCCH PRBs may be quite high. For example, in the 700 MHz band the blanking of about 12 PRBs on each side of the spectrum has been considered, corresponding to a loss of more than 10 Mbps in single UE 10 peak data rates.

The exemplary embodiments may be supported with minimal changes related to the downlink control signalling of LTE Rel.8 (i.e., w/o new grant).

One exemplary benefit of Approach 1 is that the UE 10 has full knowledge of the locations of occupied PUCCH PRBs. This information can be potentially used in the optimization of sounding reference symbols (SRS) transmission as well. Furthermore, the resource allocation rule is made very simple.

One exemplary benefit of Approach 2 is that it provides optimal signalling overhead, as only two bits of additional signalling need be used. It is also noted that in certain scenarios no additional higher layer signalling is needed.

Based on the foregoing it should be apparent that the exemplary embodiments of this invention provide a method, apparatus and computer program product(s) to provide an enhanced allocation of bandwidth for an uplink control channel, and more specifically to provide a flexible allocation of uplink system bandwidth and location(s) of an uplink control and other channels.

Figure 8:
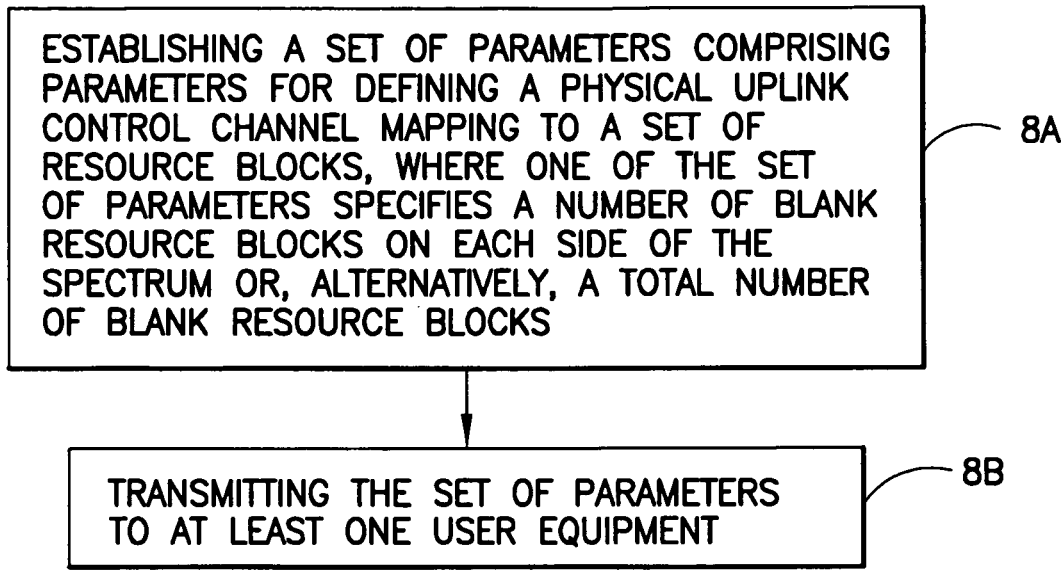
FIG. 8 is a logic flow diagram that illustrates the operation of a method, and a result of execution of computer program instructions, in accordance with the exemplary embodiments of this invention.

FIG. 8 is a logic flow diagram that illustrates the operation of a method, and a result of execution of computer program instructions, in accordance with the exemplary embodiments of this invention. At Block 8A there is a step of establishing a set of parameters comprising parameters for defining a physical uplink control channel mapping to a set of resource blocks, where one of the set of parameters specifies a number of blank resource blocks on each side of the spectrum or, alternatively, a total number of blank resource blocks. At Block 8B there is a step of transmitting the set of parameters to at least one user equipment.

In the method and the execution of the computer program instructions as in the preceding paragraph, where the parameter that specifies the number of blank resource blocks is transmitted in a master information block or in a system information block.

In the method and the execution of the computer program instructions as in the preceding paragraphs, where the parameter that specifies the number of blank resource blocks is comprised of a first parameter for the lower edge of the spectrum and a second parameter for the upper edge of the spectrum.

In the method and the execution of the computer program instructions as in the preceding paragraphs, where the user equipment responds to the transmitted set of parameters, based on any uplink resource allocation given with DCI format 0 (UL grant), by avoiding transmitting data on those resource blocks occupied by the physical uplink control channel.

Figure 9:
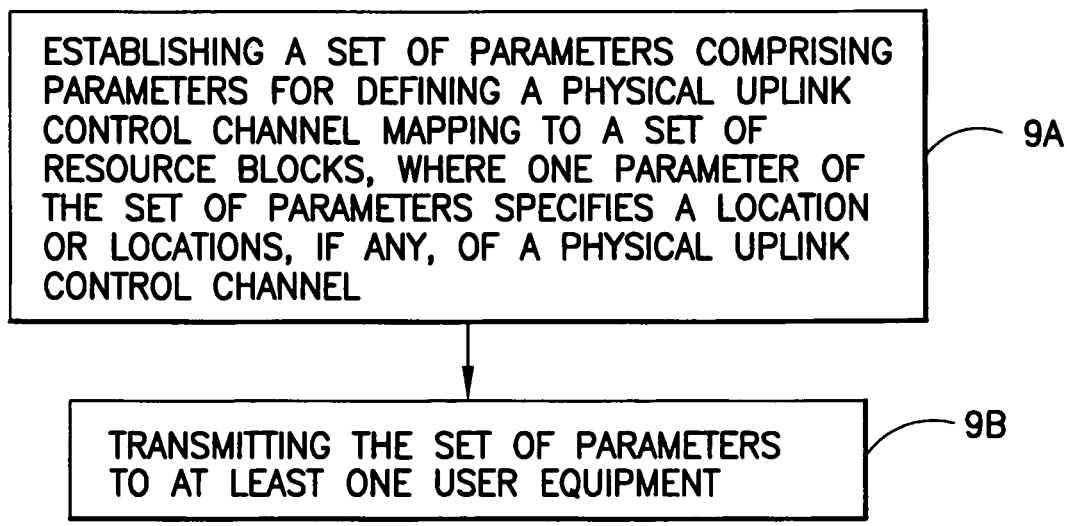
FIG. 9 is a logic flow diagram that illustrates the operation of a method, and a result of execution of computer program instructions, further in accordance with the exemplary embodiments of this invention.

FIG. 9 is a logic flow diagram that illustrates the operation of a method, and a result of execution of computer program instructions, in accordance with the exemplary embodiments of this invention. At Block 9A there is a step of establishing a set of parameters comprising parameters for defining a physical uplink control channel mapping to a set of resource blocks, where one parameter of the set of parameters specifies a location or locations, if any, of a physical uplink control channel fragment. At Block 9B there is a step of transmitting the set of parameters to at least one user equipment.

In the method and the execution of the computer program instructions as in the preceding paragraph, where the parameter that specifies the location or locations, if any, of the physical uplink control channel fragment comprises at least two signaling bits for indicating one of:
(i) no PUCCH blanking→no PUSCH fragments available;
(ii) PUSCH fragment on the lower side of the spectrum;
(iii) PUSCH fragment on the upper side of the spectrum; or
(iv) PUSCH fragments on both sides of the spectrum.

In the method and the execution of the computer program instructions as in the preceding paragraphs, where the parameter that specifies the location or locations, if any, of the physical uplink control channel fragment is transmitted in a master information block or in a system information block.

In the method and the execution of the computer program instructions as in the preceding paragraphs, where the user equipment responds to the transmitted set of parameters so as to have knowledge of the location of the physical uplink control channel fragment that is available for data transmission when interpreting an uplink grant.

Figure 10:
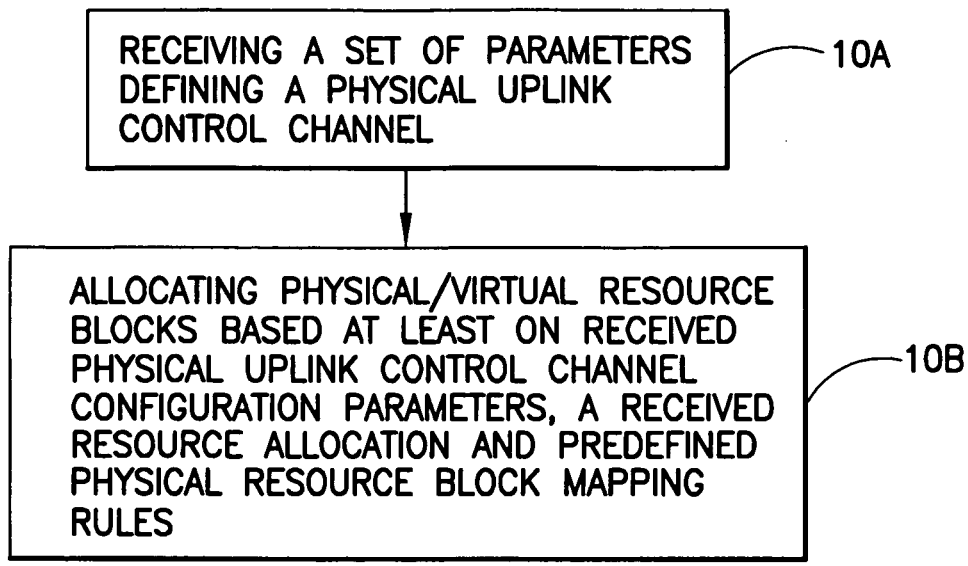
FIG. 10 is a logic flow diagram that illustrates the operation of a method, and a result of execution of computer program instructions, further in accordance with the exemplary embodiments of this invention.

(A) FIG. 10 is a further logic flow diagram that illustrates the operation of a method, and a result of execution of computer program instructions, in accordance with the exemplary embodiments of this invention. At Block 10A there is a step of receiving a set of parameters defining a physical uplink control channel; and at Block 10B there is a step of allocating physical/virtual resource blocks based at least on received physical uplink control channel configuration parameters, a received resource allocation and predefined physical resource block mapping rules.

(B) In the method and the execution of the computer program instructions as in the preceding paragraph, where the physical resource block mapping rules are such that their use avoids allocation of resources for physical uplink shared channel that are allocated for the physical uplink control channel.

(C) In the method and the execution of the computer program instructions as in the preceding paragraphs, where a physical resource block mapping rule is selected based on physical uplink control channel configuration signaling.

(D) In the method and the execution of the computer program instructions as in the preceding paragraphs, where one of the set of parameters specifies a number of blank resource blocks on each side of the spectrum or, alternatively, a total number of blank resource blocks.

(E) In the method and the execution of the computer program instructions as in the preceding paragraph, where the parameter that specifies the number of blank resource blocks is received in a master information block or in a system information block.

(F) In the method and the execution of the computer program instructions as in the preceding paragraphs, where the parameter that specifies the number of blank resource blocks is comprised of a first parameter for the lower edge of the spectrum and a second parameter for the upper edge of the spectrum.

(G) In the method and the execution of the computer program instructions as in the preceding paragraphs, further comprising responding to the received set of parameters, based on any uplink resource allocation scheme, such as one given with DCI format 0 (UL grant), or in the case of semi-persistent scheduling with RRC signaling, by avoiding transmitting data on those resource blocks occupied by the physical uplink control channel.

(H) In the method and the execution of the computer program instructions as in the preceding paragraphs (A)-(C), where the set of parameters includes a parameter that specifies a location or locations, if any, of a physical uplink control channel fragment, the parameter comprising at least two signaling bits for indicating one of:
(i) no PUCCH blanking→no PUSCH fragments available;
(ii) PUSCH fragment on the lower side of the spectrum;
(iii) PUSCH fragment on the upper side of the spectrum; or
(iv) PUSCH fragments on both sides of the spectrum.

(I) In the method and the execution of the computer program instructions as in the preceding paragraph, where the parameter that specifies the location or locations, if any, of the physical uplink control channel fragment is received in a master information block or in a system information block.

Figure 11:
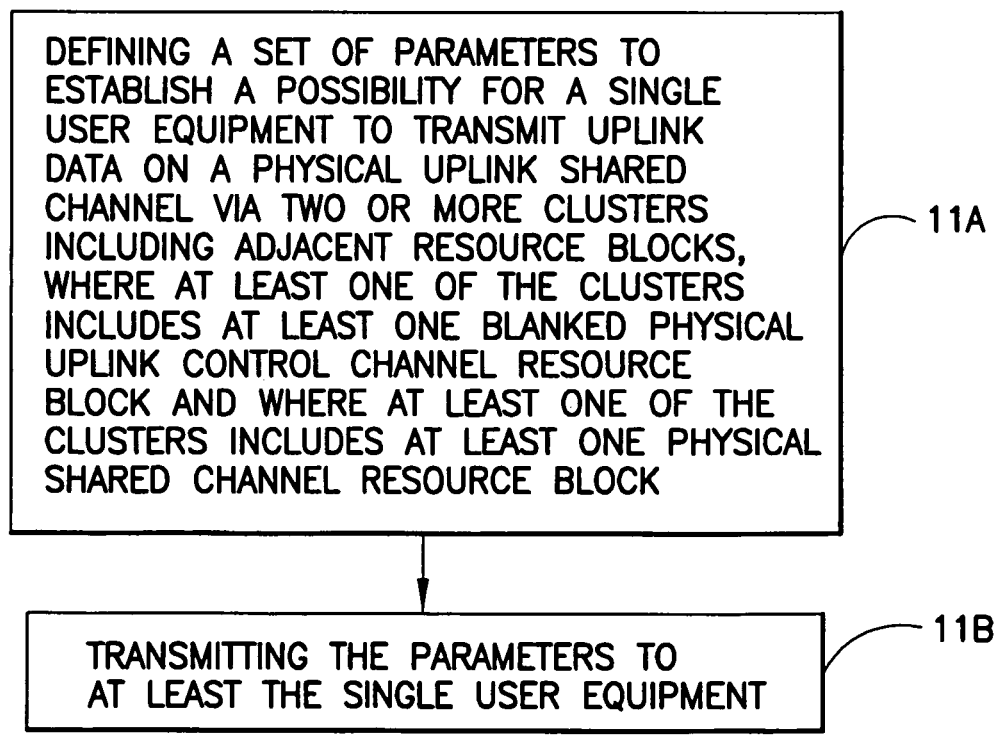
FIG. 11 is a logic flow diagram that illustrates the operation of a method, and a result of execution of computer program instructions, further in accordance with the exemplary embodiments of this invention.

FIG. 11 is a logic flow diagram that illustrates the operation of a method, and a result of execution of computer program instructions, in accordance with the exemplary embodiments of this invention. At Block 11A there is a step of defining a set of parameters to establish a possibility for a single user equipment to transmit uplink data on a physical uplink shared channel via two or more clusters including adjacent resource blocks, where at least one of the clusters includes at least one blanked physical uplink control channel resource block and where at least one of the clusters includes at least one physical shared channel resource block. At Block 11B there is a step of transmitting the parameters to at least the single user equipment.

In the method and the execution of the computer program instructions as in the preceding paragraphs, where one parameter of the set of parameters specifies one of a number of blank resource blocks on each side of a spectrum and a total number of blank resource blocks.

In the method and the execution of the computer program instructions as in the preceding paragraphs, where the parameter that specifies the number of blank resource blocks is transmitted in at least one of a master information block and a system information block.

In the method and the execution of the computer program instructions as in the preceding paragraphs, where one of the parameters in the set of parameters specifies that uplink resource allocation grant is interpreted as "clustered resource allocation grant" instead of "localized resource allocation grant".

In the method and the execution of the computer program instructions as in the preceding paragraphs, where the parameter that specifies the number of blank resource blocks is comprised of a first parameter for a lower edge of a spectrum and a second parameter for an upper edge of the spectrum.

In the method and the execution of the computer program instructions as in the preceding paragraphs, where the transmitted parameters allow for the single user equipment to avoid transmitting data on those resource blocks occupied by the physical uplink control channel regardless of an uplink grant.

In the method and the execution of the computer program instructions as in the preceding paragraphs, where one parameter of the set of parameters specifies non-blanked physical uplink control channel resource blocks that are excluded from a physical uplink shared channel grant.

In the method and the execution of the computer program instructions as in the preceding paragraphs, where one parameter of the set of parameters specifies a location or locations, if any, of a physical uplink control channel fragment.

In the method and the execution of the computer program instructions as in the preceding paragraphs, where the parameter that specifies the location or locations, if any, of the physical uplink control channel fragment comprises at least two signaling bits for indicating one of:
(i) no PUCCH blanking→no PUSCH fragments available;
(ii) PUSCH fragment on the lower side of the spectrum;
(iii) PUSCH fragment on the upper side of the spectrum; or
(iv) PUSCH fragments on both sides of the spectrum.

In the method and the execution of the computer program instructions as in the preceding paragraphs, where the parameter that specifies the location or locations, if any, of the physical uplink control channel fragment is transmitted in one of a master information block and a system information block.

In the method and the execution of the computer program instructions as in the preceding paragraphs, where the transmitted set of parameters indicates to the single user equipment the location of the physical uplink control channel fragment that is available for data transmission when interpreting an uplink grant.

The method and the execution of the computer program instructions as in the preceding paragraphs, performed by computer program embodied on a memory and executed by at least one processor.

The various blocks shown in FIGS. 8, 9, 10, and 11 may be viewed as method steps, and/or as operations that result from operation of computer program code, and/or as a plurality of coupled logic circuit elements constructed to carry out the associated function(s).

These exemplary embodiments also provide an apparatus comprising means for establishing a set of parameters comprising micro-configuration parameters and at least one macro-configuration parameter for defining a physical uplink control channel and other channel resource allocation mapping to a set of resource blocks, and means for transmitting the set of parameters to at least one user equipment. The apparatus may be embodied as one or more integrated circuits.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. As such, it should be appreciated that at least some aspects of the exemplary embodiments of the inventions may be practiced in various components such as integrated circuit chips and modules.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system and the LTE-Advanced system, it should be appreciated that the exemplary embodiments of this invention are not limited for use with only these particular types of wireless communication systems, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., $N_{RB}^{blank}$, Location_of_fragmented_PUSCH_region, etc.) are not intended to be limiting in any respect, as these parameters may be identified by any suitable names. Further, the various names assigned to different channels (e.g., PUCCH, PUSCH, PCFICH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
  defining a set of parameters to establish a possibility for a single user equipment to transmit uplink data on a physical uplink shared channel via two or more clusters including adjacent resource blocks, where at least one of the clusters includes at least one blanked physical uplink control channel resource block, where at least one of the clusters includes at least one physical shared channel resource block, and where one parameter of the set of parameters specifies non-blanked physical uplink control channel resource blocks that are excluded from a physical uplink shared channel grant; and
  transmitting the parameters to at least the single user equipment.

2. The method according to claim 1, where one parameter of the set of parameters specifies a total number of blank resource blocks.

3. The method according to claim 2, where the parameter that specifies the total number of blank resource blocks is transmitted in at least one of a master information block and a system information block.

4. The method according to claim 1, where one of the parameters in the set of parameters specifies that uplink resource allocation grant is interpreted as "clustered resource allocation grant" instead of "localized resource allocation grant".

5. The method according to claim 1, where the transmitted parameters allow for the single user equipment to avoid transmitting data on those resource blocks occupied by the physical uplink control channel regardless of an uplink grant.

6. The method according to claim 1, where one parameter of the set of parameters specifies a location or locations, if any, of a physical uplink shared channel fragment.

7. The method according to claim 6, where the parameter that specifies the location or locations, if any, of the physical uplink shared channel fragment comprises at least two signaling bits for indicating one of
  no physical uplink control channel blanking→no physical uplink shared channel fragments available;
  physical uplink shared channel fragment on the lower side of the spectrum;
  physical uplink shared channel fragment on the upper side of the spectrum; or
  physical uplink shared channel fragments on both sides of the spectrum.

8. The method according to claim 6, where the parameter that specifies the location or locations, if any, of the physical uplink shared channel fragment is transmitted in one of a master information block and a system information block.

9. The method according to claim 6, where the transmitted set of parameters indicates to the single user equipment the location of the physical uplink shared channel fragment that is available for data transmission when interpreting an uplink grant.

10. The method according to claim 1, where parameters in the set of parameters specify edges of a spectrum associated with the physical uplink shared channel and are comprised of a first parameter for a lower edge of the spectrum and a second parameter for an upper edge of the spectrum.

11. A non-transitory computer readable medium encoded with a computer program executable by a processor to perform actions comprising:
defining a set of parameters to establish a possibility for a single user equipment to transmit uplink data on a physical uplink shared channel via two or more clusters including adjacent resource blocks, where at least one of the clusters includes at least one blanked physical uplink control channel resource block, where at least one of the clusters includes at least one physical shared channel resource block, and where one parameter of the set of parameters specifies non-blanked physical uplink control channel resource blocks that are excluded from a physical uplink shared channel grant; and
transmitting the parameters to at least the single user equipment.

12. The non-transitory computer readable medium encoded with a computer program according to claim 11, where one parameter of the set of parameters specifies one of a number of blank resource blocks on each side of a spectrum and a total number of blank resource blocks.

13. An apparatus comprising:
at least one processor; and
at least one memory including computer program code, where the at least one memory and the computer program code are configured, with the at least one processor, to cause the apparatus to at least:
define a set of parameters to establish a possibility for a single user equipment to transmit uplink data on a physical uplink shared channel via two or more clusters including adjacent resource blocks, where at least one of the clusters includes at least one blanked physical uplink control channel resource block, where at least one of the clusters includes at least one physical shared channel resource block, where one parameter of the set of parameters specifies non-blanked physical uplink control channel resource blocks that are excluded from a physical uplink shared channel grant; and
transmit the parameters to at least the single user equipment.

14. The apparatus according to claim 13, where one parameter of the set of parameters specifies a total number of blank resource blocks.

15. The apparatus according to claim 13, where one of the parameters in the set of parameters specifies that uplink resource allocation grant is interpreted as "clustered resource allocation grant" instead of "localized resource allocation grant".

16. The apparatus according to claim 13, where the transmitted parameters allow for the single user equipment to avoid transmitting data on those resource blocks occupied by the physical uplink control channel regardless of an uplink grant.

17. The apparatus according to claim 13, where one parameter of the set of parameters specifies a location or locations, if any, of a physical uplink shared channel fragment.

18. The apparatus according to claim 17, where the parameter that specifies the location or locations, if any, of the physical uplink shared channel fragment comprises at least two signaling bits for indicating one of
no physical uplink control channel blanking→no physical uplink shared channel fragments available;
physical uplink shared channel fragment on the lower side of the spectrum;
physical uplink shared channel fragment on the upper side of the spectrum; or
physical uplink shared channel fragments on both sides of the spectrum.

19. The apparatus according to claim 17, where the parameter that specifies the location or locations, if any, of the physical uplink shared channel fragment is transmitted in one of a master information block and a system information block.

20. The apparatus according to claim 17, where the transmitted set of parameters indicates to the single user equipment the location of the physical uplink shared channel fragment that is available for data transmission when interpreting an uplink grant.

21. The apparatus according to claim 13, where parameters in the set of parameters specify edges of a spectrum associated with the physical uplink shared channel and are comprised of a first parameter for a lower edge of the spectrum and a second parameter for an upper edge of the spectrum.

* * * * *